(12) United States Patent
Huang

(10) Patent No.: US 9,138,932 B2
(45) Date of Patent: Sep. 22, 2015

(54) ELECTRODE-SEPARATOR INTEGRAL SEGMENT FOR A LITHIUM ION BATTERY

(75) Inventor: Xiaosong Huang, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 563 days.

(21) Appl. No.: 13/407,893

(22) Filed: Feb. 29, 2012

(65) Prior Publication Data

US 2013/0224602 A1  Aug. 29, 2013

(51) Int. Cl.
| | |
|---|---|
| *H01M 2/16* | (2006.01) |
| *H01M 4/82* | (2006.01) |
| *B29C 47/06* | (2006.01) |
| *B29C 47/02* | (2006.01) |
| *B29C 47/54* | (2006.01) |
| *H01M 2/14* | (2006.01) |
| *B29C 47/00* | (2006.01) |
| *B29C 47/04* | (2006.01) |
| *H01M 10/0525* | (2010.01) |

(52) U.S. Cl.
CPC ............ *B29C 47/025* (2013.01); *B29C 47/54* (2013.01); *H01M 2/145* (2013.01); *H01M 2/162* (2013.01); *B29C 47/0014* (2013.01); *B29C 47/04* (2013.01); *H01M 10/0525* (2013.01); *Y02T 10/7011* (2013.01); *Y10T 29/49108* (2015.01)

(58) Field of Classification Search
CPC . H01M 2/145; H01M 2/162; H01M 10/0525; H01M 4/82

USPC ............... 429/247, 145, 144, 254, 255, 249; 29/623.1, 623.2, 623.3, 623.4, 623.5; 427/77; 428/339; 361/500, 502; 264/466

See application file for complete search history.

(56) References Cited

U.S. PATENT DOCUMENTS

| 2005/0053840 A1* | 3/2005 | Jo et al. ..................... 429/247 |
| 2008/0102358 A1* | 5/2008 | Kowalczyk et al. ........ 429/127 |
| 2009/0026662 A1* | 1/2009 | Yun et al. ................... 264/466 |
| 2009/0208826 A1* | 8/2009 | Lee et al. ..................... 429/94 |
| 2010/0195270 A1* | 8/2010 | Hayakawa et al. .......... 361/502 |
| 2011/0157771 A1* | 6/2011 | Gibson et al. ............... 361/500 |

* cited by examiner

*Primary Examiner* — Kenneth Douyette
(74) *Attorney, Agent, or Firm* — Reising Ethington P.C.

(57) ABSTRACT

A method of making a separator for an electrochemical battery cell of a lithium ion battery includes electrospinning a non-woven polymer fiber mat onto a collection face of a collector substrate. The separator may be formed entirely of the electrospun non-woven polymer fiber mat or it may be a multi-layer composite that contains other components in addition to the electrospun non-woven polymer fiber mat. The collector substrate comprises an electrode (positive or negative) optionally covered with a ceramic particle layer such that electrospinning of the non-woven polymer fiber mat forms an electrode-separator integral segment. The electrode-separator integral segment may then be assembled into an electrochemical battery cell of a lithium ion battery.

20 Claims, 3 Drawing Sheets

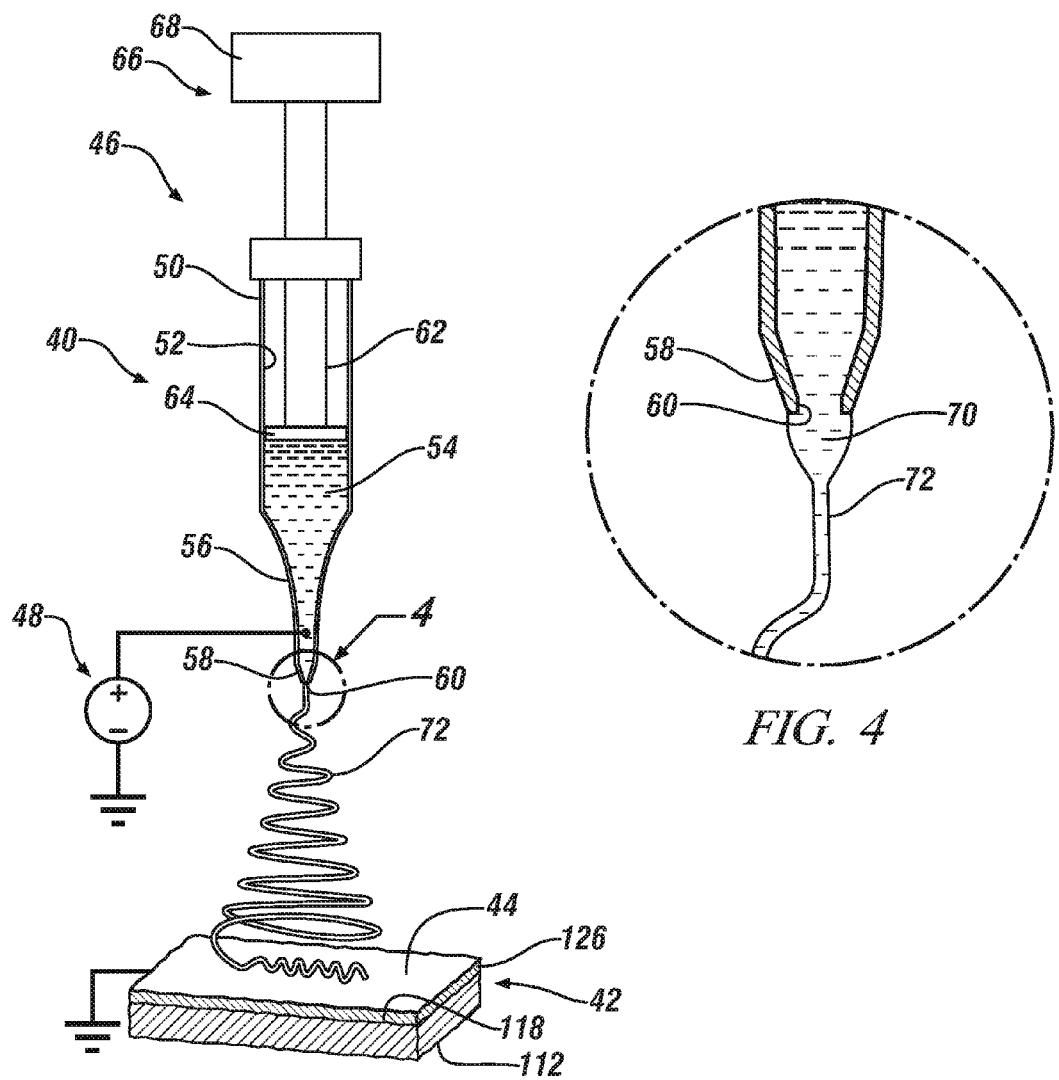
FIG. 3
FIG. 4
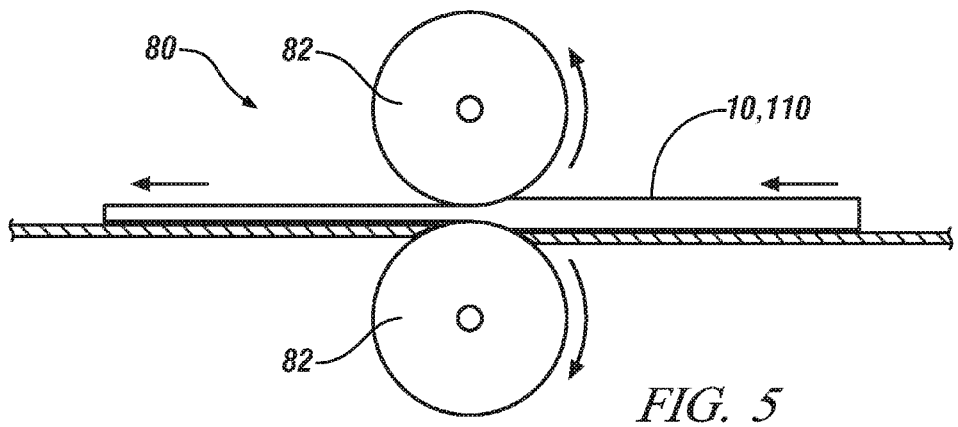
FIG. 5

ELECTRODE-SEPARATOR INTEGRAL SEGMENT FOR A LITHIUM ION BATTERY

TECHNICAL FIELD

The technical field of this disclosure relates generally to a separator for use in a secondary lithium ion battery. The separator, more specifically, includes an electrospun non-woven polymer fiber mat. A method of making such a separator includes electrospinning the non-woven polymer fiber mat over an electrode optionally covered with a ceramic particle layer that has been configured as all or part of a collector substrate. The resultant electrode-separator integral segment may then be assembled into an electrochemical battery cell of a lithium ion battery.

BACKGROUND

A secondary lithium ion battery is a rechargeable power source that can be implemented into a wide variety of stationary and portable applications. The structure and electrochemical reaction mechanism of a lithium ion battery provide it with several desirable characteristics including a relatively high energy density, a relatively low internal resistance, a general non-appearance of any memory effect when compared to other types of rechargeable batteries, for example, a nickel-cadmium battery, and a low self-discharge rate. These characteristics have made the lithium ion battery the preferred mobile power source for portable consumer electronics such as laptop computers and cell phones. Larger-scale versions that interact with a multitude of interconnected systems have also been designed and manufactured by the automotive industry in an effort to improve vehicle fuel efficiency and reduce atmospheric pollution. The powertrains of hybrid electric vehicles (HEV) and extended range electric vehicles (EREV), for example, rely on the cooperative effort of multiple lithium ion batteries, usually grouped together in a lithium ion battery pack, and a hydrocarbon-fueled internal combustion engine to generate power for vehicle operation.

A lithium ion battery generally contains one or more electrochemical battery cells that include a negative electrode, a positive electrode, and a separator sandwiched between the electrodes. Each of these battery components is wetted with a liquid electrolyte solution that can communicate lithium ions. The negative and positive electrodes are formed of different materials that can store intercalated lithium at different electrochemical potentials. These electrodes may be interruptably connected by an external circuit that provides an electrical current path around the separator. The electrical circuit, as such, communicates an electrical current between the electrodes around the separator while lithium ions migrate through the separator either spontaneously (discharge phase) or non-spontaneously (charging phase). An electrical load may be coupled to the external circuit during cell discharge to make use of the electrical current. Conversely, an applied voltage from an external power source may be coupled to the external circuit to drive the reverse the electrochemical reactions that transpired during cell discharge. Each of the negative and positive electrodes may also be intimately associated with a metallic current collector to supply and receive the electrical current to and from the external circuit depending on the operating state of the electrochemical cell.

The separator functions to provide a porous and electrically insulative mechanical support barrier between the two electrodes. The separator has to be sufficiently porous to permit the internal communication of lithium ions and, at the same time, exhibit a mechanical structure that is able to physically and electrically separate the negative and positive electrodes so that a short-circuit is prevented. An extruded or cast thin-film polyolefin membrane derived from simple low carbon number olefins, such as polyethylene and polypropylene, has conventionally been implemented as the separator because of its chemical stability, mechanical strength, and relatively low cost. Imparting a workable porosity into these types of membranes often requires uniaxial or biaxial stretching during their manufacture. For example, a "dry technique" for making a polyolefin membrane involves melting a polyolefin feedstock, extruding the melted polyolefin into a film, annealing the film, and then uniaxially stretching the film. A "wet technique" may also be practiced in which a polyolefin feedstock is first mixed with a hydrocarbon or other low-molecular weight liquid substance. The mixture is then heated, melted, extruded into a sheet, and biaxially stretched. The hydrocarbon or other low-molecular weight liquid substance is eventually extracted after stretching.

An extruded or cast thin-film polyolefin membrane formed from polyethylene and/or polypropylene, however, is potentially susceptible to certain performance declines when heated excessively. Exposure of the electrochemical battery cell to temperatures of 80° C. and above can cause the polyolefin membrane to shrink, soften, and even melt. Such high temperatures can be attributed to charging-phase heat generation, ambient atmospheric temperature, or some other source. The physical distortion of a polyolefin membrane may ultimately permit direct electrical contact between the negative and positive electrodes and cause the electrochemical cell to short-circuit. Battery thermal runaway is also a possibility if the electrodes come into direct electrical contact with one another to an appreciable extent. This tendency of an extruded or cast thin-film polyolefin membrane to lose some thermal stability at temperatures exceeding 80° C. for prolonged periods is a potential concern for some lithium ion battery applications.

A separator fabricated at least in part from one of several types of engineering polymers that exhibit better thermal stability than, and at least comparable chemical stability to, polypropylene and polyethylene could potentially enhance the temperature operating window of an electrochemical battery cell and, consequently, a lithium ion battery. But the "dry" and "wet" membrane fabrication techniques often used to make a thin-film polyolefin membrane generally cannot transform these types of polymers into a membrane that exhibits sufficient porosity across its thickness at reasonable costs. The stretching techniques often employed in conventional thin-film polyolefin membrane manufacturing processes have also been shown to adversely affect the dimensional stability of membranes formed from certain engineering polymer materials at elevated temperatures above 80° C. and, more noticeably, above 100° C. A fabrication method that can reliably produce a thermally stable and sufficiently porous separator from a robust array of polymer materials is therefore needed.

SUMMARY OF THE DISCLOSURE

A separator that is disposed between a negative electrode and a positive electrode in an electrochemical battery cell of a lithium ion battery, and a method for making the separator, are disclosed. The separator includes an electrospun non-woven polymer fiber mat that may function as all or part of the separator. The non-woven polymer fiber mat is an intimately arranged fibrous mass of one or more polymer fibers that exhibit a nanometer- to micrometer-sized diameter. A polymer fiber of this size formed by electrospinning exhibits a high surface area to mass ratio and is relatively strong. These size and physical property attributes of the one or more polymer fibers promote compressive and dimensional strength in the non-woven polymer fiber mat and the formation of pores that collectively impart an appreciable porosity to the mat. The one or more polymer fibers that form the non-woven polymer fiber mat are preferably those of a polymer material that is conducive to electrospinning such as, for example, a polyolefin (PO), a polyimide (PI), a polyamide (PA), a polysulfone (PSF), a polyester (PE), a fluoropolymer (FP), a polyacrylate (PAC), a polyacrylonitrile (PAN), a polycarbonate (PC), a polyurethane (PU), and mixtures thereof.

If the one or more polymer fibers are derived from a polymer material that is deemed to possess insufficient thermal stability, or if the pores defined in the non-woven polymer fiber mat are thought to be too large, then a ceramic particle layer may be included in the separator next to the non-woven polymer fiber mat. The inclusion of the ceramic particle layer within the separator may be appropriate when the one or more polymer fibers are those of a polyolefin such as polyethylene or polypropylene. The presence of the ceramic particle layer, however, is not necessarily limited to such polymer fibers and it may be used with others as well. The ceramic particle layer includes ceramic particles such as, for example, those of alumina, titania, silica, ceria, zirconia, beryllia, magnesia, silicon carbide, boron carbide, hafnium carbide, titanium nitride, silicon nitride, titanium silicide, tungsten silicide, aluminum boride, titanium boride, mullite, spodumene, zirconium silicate, sillimanite, or petalite, to name but a few examples. The ceramic particles have particle diameters that preferably range from about 5 nm to about 2 µm.

A method for making the separator includes electrospinning the non-woven polymer fiber mat onto a collection face of a collector substrate. The collector substrate comprises an electrode (positive or negative) optionally covered with the ceramic particle layer. Either the electrode or, if present, the optional overlying ceramic particle layer, is exposed at the collection face. The electrospinning process includes generating an electric field between a tip of a nozzle of an electrospinning apparatus and the collection face of the collector substrate. The polymer liquid is then pushed through an orifice defined in the tip of the nozzle. The generated electric field acts on the polymer liquid at the orifice and an electrified jet of the liquid polymer is ejected towards the collection face of the collector substrate. This electrified jet transforms into the one or more polymer fibers in route to the collector substrate depending on whether the electrospinning apparatus is continuously or intermittently operated as well as other operational conditions. The nozzle of the electrospinning apparatus or the collector substrate, or both, is moved during the electrospinning process to ensure the one or more polymer fibers are deposited on the collection face as intended. Eventually, the fibrous mass of the one or more polymer fibers that constitutes the non-woven polymer fiber mat is collected on the collection face to fabricate an electrode-separator integral segment.

The electrode-separator integral segment may then be assembled into an electrochemical battery cell of a lithium ion battery. Such assembly generally involves pressing the electrode-separator integral segment together with another electrode (positive or negative). This other electrode is composed to function as the opposite of the electrode included in the electrode-separator integral segment. The separator, which includes the non-woven polymer fiber mat, functions as a thin and electrically insulative mechanical barrier layer that physically separates the confronting electrodes. The non-woven polymer fiber mat renders the separator sufficiently porous and ionically conductive so that an infiltrated liquid electrolyte solution can facilitate the migration of lithium ions between the electrodes during operation of the lithium ion battery. The non-woven polymer fiber mat or, if necessary, the combination of the non-woven polymer fiber mat and the ceramic particle layer, is also thermally stable enough that temperature spikes in the electrochemical battery cell can be endured by the separator without a significant sacrifice in functionality.

BRIEF DESCRIPTION OF THE DRAWINGS

FIG. 3 is generalized diagrammatic illustration of an electrospinning apparatus that may be used to make the electrode-separator integral segments shown in FIGS. 1 and 2 by electrospinning a non-woven polymer fiber mat onto a collection face of a collector substrate.

FIG. 4 is a magnified and generalized illustration of a Taylor cone formed at the tip of the tubular nozzle of the electrospinning apparatus depicted in FIG. 3.

FIG. 5 is a generalized and schematic illustration of a calendering apparatus that may be used to calender the electrode-separator integral segment after the non-woven polymer fiber mat is deposited by the electrospinning apparatus depicted in FIG. 3.

DETAILED DESCRIPTION

A separator for disposition between a negative electrode and a positive electrode in an electrochemical battery cell of a lithium ion battery may include, at least in part, an electrospun non-woven polymer fiber mat. The separator may be formed entirely of the electrospun non-woven polymer fiber mat or it may be a multi-layer composite that contains other components, such as a ceramic particle layer, in addition to the electrospun non-woven polymer fiber mat. A preferred method for manufacturing the separator involves (1) positioning a collection face of a collector substrate proximate an electrospinning apparatus in which the collector substrate comprises an electrode (negative or positive) optionally covered with an overlying ceramic particle layer exposed at the collection face and (2) electrospinning the non-woven polymer fiber mat onto the electrode or, if present, the overlying ceramic particle layer. The electrode-separator integral segment formed by this method may be arranged in facing alignment with another electrode of appropriate composition to complete assembly of an electrochemical battery cell. Several embodiments of the electrode-separator integral segment that may be fabricated are shown in FIGS. 1-2.

Figure 1:
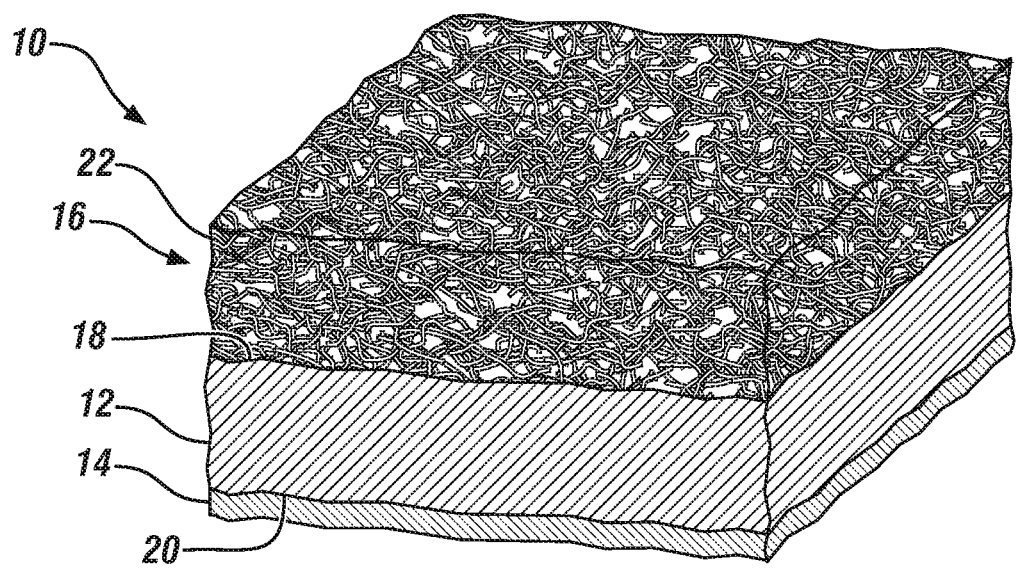
FIG. 1 is a generalized and schematic illustration of one embodiment of an electrode-separator integral segment for use in the construction of an electrochemical battery cell of a lithium ion battery. The electrode-separator integral segment includes a single-layer separator that comprises a non-woven polymer fiber mat formed by an electrospinning process.
Figure 2:
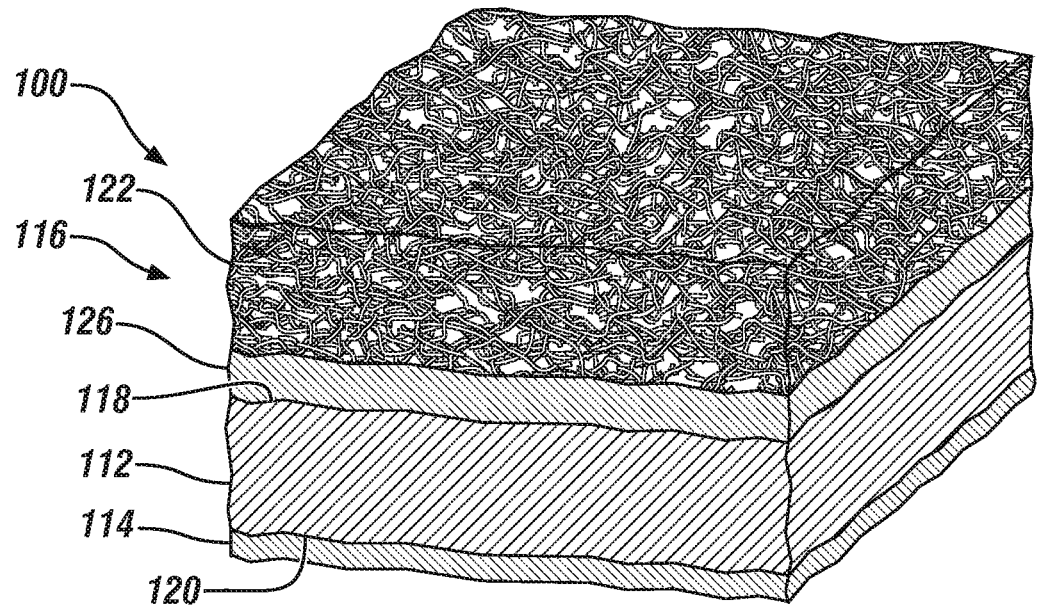
FIG. 2 is a generalized and schematic illustration of another embodiment of an electrode-separator integral segment for use in the construction of an electrochemical battery cell of a lithium ion battery. The electrode-separator integral segment includes a multi-layer composite separator that comprises a ceramic particle layer and a non-woven polymer fiber mat formed by an electrospinning process.

FIG. 1 generally and schematically illustrates an electrode-separator integral segment 10 for use, as described in more detail below, in an electrochemical battery cell of a lithium ion battery. The electrode-separator integral segment 10 comprises an electrode 12, a metallic current collector 14, and a single-layer separator 16 that contains basically one type of polymeric mechanical constituency (i.e., nanodiameter- to microdiameter-sized polymer fiber(s)) as the bulk supporting structure of the separator 16. The electrode 12 includes an inward face 18 that confronts the separator 16 and an outward face 20 that interfacially contacts the metallic current collector 14. The separator 16 illustrated here comprises a nonwoven polymer fiber mat 22 electrospun over and in direct contact with the inward face 18 of the electrode 12. A total combined thickness of the electrode-separator integral segment 10 across all three components 12, 14, 16 preferably ranges from about 45 μm to about 220 μm. It should be noted, however, despite not being shown here, that other components may be included in the electrode-separator integral segment 10 adjacent to the metallic current collector 14 such as, for example, another electrode similar to the one located adjacent to the separator 16.

The electrode 12 may be composed as either a negative electrode or a positive electrode. The compositions associated with each of these electrodes are able to intercalate and de-intercalate lithium ions without undergoing significant structural change. They are also formulated to achieve a functional difference—namely, that the two electrodes store intercalated lithium at different electrochemical potentials relative to a common reference electrode (typically lithium). In the construct of an electrochemical battery cell of a lithium ion battery, the negative electrode stores intercalated lithium at a lower electrochemical potential (i.e., a higher energy state) than the positive electrode such that an electrochemical potential difference somewhere between about 2.5 V and about 4.3 V typically exists between the electrodes, depending on their exact compositions, when the negative electrode is lithiated. These attributes of the negative and positive electrode compositions permit the reversible transfer of lithium ions between the two electrodes either spontaneously (discharge phase) or through the application of an external voltage (charge phase) during operational cycling of the electrochemical battery cell. The thickness of the electrode 12 as measured from the inward face 18 to the outward face 20 is preferably between about 30 μm and about 150 μm.

A negative electrode is preferably constructed from a lithium host material such as, for example, graphite, silicon, or lithium titanate. The lithium host material may be intermingled with a polymeric binder material to provide the negative electrode with structural integrity and, optionally, a conductive fine particle diluent. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), or mixtures thereof. Graphite is normally used to make the negative electrode because, on top of being relatively inert, its layered structure exhibits favorable lithium intercalation and deintercalation characteristics which help provide the electrochemical battery cell with a suitable energy density. Commercial forms of graphite that may be used to construct the negative electrode are available from Timcal Graphite and Carbon (headquartered in Bodio, Switzerland), Lonza Group (headquartered in Basel, Switzerland), and Superior Graphite (headquartered in Chicago, Ill.). The conductive diluent may be very fine particles of, for example, high-surface area carbon black.

A positive electrode is preferably constructed from a lithium-based active material that stores intercalated lithium at a higher electrochemical potential than the lithium host material used to make the negative electrode. The same polymeric binder materials (PVdF, EPDM, SBR, CMC) and conductive fine particle diluent (high-surface area carbon black) that may be used to construct the negative electrode may also be intermingled with the lithium-based active material for the same purposes. The lithium-based active material is preferably a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_xMn_yCO_z)O_2$], lithium iron phosphate ($LiFePO_4$), or lithium fluorophosphate ($Li_2FePO_4F$). Some other suitable lithium-based active materials that may be employed as the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. Mixtures that include one or more of these recited lithium-based active materials may also be used to make the positive electrode.

The metallic current collector 14 is preferably a thin and flexible metallic foil which contacts the outward face 20 of the electrode 12 over an appreciable interfacial surface area. Any metal that is capable of collecting and reversibly passing free electrons to and from the electrode 12 may be employed. The actual metal selected, however, typically depends on whether the electrode 12 is composed as a negative electrode or a positive electrode. If the electrode 12 is composed as a negative electrode, for instance, then the metallic current collector 14 is preferably a copper foil. If, however, the electrode 12 is composed as a positive electrode, then the metallic current collector 14 is preferably an aluminum foil. The thickness of the metallic current collector 14 as measured in the same direction as the electrode 12 is preferably between about 5 μm and about 20 μm regardless of whether the electrode 12 is composed as a negative or positive electrode. Other types of metal foils besides those just mentioned may of course be used, if desired.

The non-woven polymer fiber mat 22 is an intimately arranged fibrous mass that, as mentioned before, is electrospun over and in direct contact with the inward face 18 of the electrode 12. The fibrous mass is formed of one or more polymer fibers depending on whether the electrospinning process—a preferred embodiment of which is described later—is operated continuously or intermittently during formation of the mat 22. The one or more polymer fibers may exhibit a nanometer- to micrometer-sized diameter and, preferably, are randomly arranged within the fibrous mass. A more specific range for the diameter of the polymer fiber(s) is about 10 nm to 10 μm, more preferably about 50 nm to about 2 μm, and most preferably about 50 nm to about 1 μm. Such a small-diameter polymer fiber formed by the electrospinning process is relatively strong and possesses a high surface area to mass ratio. It can also delineate very small pores with itself and/or other closely arranged polymer fibers so that a porosity of about 30% to about 95% can be imparted to the non-woven polymer fiber mat 22. These structural and functional characteristics of the polymer fiber(s) give the non-woven polymer fiber mat 22 the mechanical strength and ionic conductance generally needed to function as the separator 16. The thickness of the non-woven polymer fiber mat 22 as measured in the same direction as the electrode 12 is preferably between about 10 μm and about 50 μm.

The one or more polymer fibers that form the fibrous mass of the non-woven polymer fiber mat 22 are preferably those of a polymer material that is conducive to electrospinning Some exemplary polymer materials that may be employed include a polyolefin (PO), a polyimide (PI), a polyamide (PA), a polysulfone (PSF), a polyester (PE), a fluoropolymer (FP), a polyacrylate (PAC), polyacrylonitrile (PAN), a polycarbonate (PC), a polyurethane (PU), and mixtures thereof. Specific and exemplary polymer materials encompassed by these polymer material families include polypropylene (PP), polyethylene (PE), polyetherimide (PEI), polyhexamethylene adipamide (nylon 6,6), polycaprolactam (nylon 6), an aromatic polyamide such as polyparaphenylene terephthalamide (i.e., Kevlar®), polyarylsulfone (PAS), polyethersulfone (PES), polyphenylsulfone (PPSF), a thermoplastic polyester such as polyethylene terephthalate (PET), a liquid crystal polymer such as the polycondensation product of 4-hydroxybenzoic acid and 6-hydroxynaphthalene-2-carboxylic acid (i.e., Vectran®), polyvinylidene fluoride (PVdF), poly(methyl methacrylate) (PMMA), poly(bisphenol A-carbonate), and polyether- and polyester-based polyurethanes. PET, PAN, PEI, an aromatic polyamide such as Kevlar®, a liquid crystal polymer such as Vectran®, and PVdF are the most preferred polymer materials for making the non-woven polymer fiber mat 22.

FIG. 2 generally and schematically illustrates another electrode-separator integral segment 100 that may be fabricated. The electrode-separator integral segment 100 shown here is the same in many respects as the electrode-separator integral segment 10 just discussed and, for this reason, like features are represented by like numerals. The one notable difference is that the electrode-separator integral segment 100 includes a multi-layer composite separator 116 instead of the single-layer separator 16 previously-described. The multi-layer composite separator 116 shown here comprises a ceramic particle layer 126 applied over and in direct contact with the inward face 118 of the electrode 112 and a non-woven polymer fiber mat 122 electrospun over the ceramic particle layer 126. The ceramic particle layer 126 is preferably employed when the thermal stability or porosity of the one or more polymer fibers that form the non-woven polymer fiber mat 122 are considered not sufficient for whatever reason. This is usually the case when the one or more polymer fibers are comprised of a polyolefin such as, for instance, polyethylene and polypropylene, but other reasons may exist for other polymer fibers as well. A total combined thickness of the electrode-separator integral segment 100 preferably ranges from about 45 µm to about 220 µm similar to the electrode-separator integral segment 10 shown in FIG. 1.

The ceramic particle layer 126 includes ceramic particles such as, for example, those of alumina, titania, silica, ceria, zirconia, beryllia, magnesia, silicon carbide, boron carbide, hafnium carbide, titanium nitride, silicon nitride, titanium silicide, tungsten silicide, aluminum boride, titanium boride, mullite, spodumene, zirconium silicate, sillimanite, or petalite, to name but a few examples. The ceramic particles have particle diameters that preferably range from about 5 nm to about 2 µm and, most preferably, from about 50 nm to about 700 nm. Application of the ceramic particle layer 126 over the inward face 118 of the electrode 112 may be accomplished by spraying or coating a ceramic particle dispersion that includes water and/or an organic solvent, for example, as the continuous liquid phase. The presence of the ceramic particle layer 126 within the multi-layer composite separator 116 provides a very high thermal stability stable barrier layer immediately adjacent to the electrode 112. Such placement of the ceramic particle layer 126 operates to shield the non-woven polymer fiber mat 122, if necessary, from exposure to a debilitating heat influx that could conceivably emanate from the electrode 12 under certain circumstances during operation of an electrochemical battery cell of a lithium ion battery. The thickness of the ceramic particle layer 126 as measured in the same direction as the electrode 112 is preferably between about 5 µm and about 20 µm.

The non-woven polymer fiber mat 122 electrospun over the ceramic particle layer 126 is basically the same as before. This is because a fibrous mass with the same attributes is still the main structural constituent. The non-woven polymer fiber mat 122 can, however, be thinner than the embodiment shown in FIG. 1 due to the inclusion of the ceramic particle layer 126 in the multi-layer composite separator 116. Here, the thickness of the non-woven polymer fiber mat 122 as measured in the same direction as the electrode 112 is preferably between about 5 µm and about 45 µm while the total thickness of the multi-layer composite separator 116 ranges from about 10 µm to about 50 µm. All other aspects of the non-woven polymer fiber mat 122 are the same; that is, the same types of polymer fibers may be electrospun to form the fibrous mass with the same porosity characteristics as previously described.

The electrode-separator integral segments 10, 110 shown in FIGS. 1 and 2, as well as related variations, can be prepared by a method that includes electrospinning the non-woven polymer fiber mat 22, 122 from an electrospinning apparatus 40, which is depicted generally in FIG. 3. The electrospinning apparatus 40 is situated near a collector substrate 42 which includes a collection face 44 oriented towards the apparatus 40. Exposed at the collection face 44 is the inward face 18 of the electrode 12, as shown in FIG. 1, or the ceramic particle layer 126 that overlies the inward face 118 of the electrode 112, as shown in FIG. 2. The collector substrate 42 may also include the metallic current collector 14, 114 adjacent to the electrode 12, 112 and opposite the collection face 44, as well as other components, if desired. For the purpose of demonstrating the operation of the electrospinning apparatus 40, the collector substrate 40 has been illustrated as including the electrode 112 and the overlying optional ceramic particle layer 126. This ultimately results in the electrode-separator integral segment 110 depicted in FIG. 2 being formed. But it should be understood the following description can also be applied equally to the formation of the electrode-separator integral segment 10 depicted in FIG. 1 by simple omission of the ceramic particle layer 126.

The electrospinning apparatus 40 comprises a syringe 46 and a high-voltage direct-current (DC) power supply 48. The syringe 46 includes a barrel 50 that defines an interior chamber 52 for holding a polymer liquid 54. A tubular nozzle 56 that fluidly communicates with the interior chamber 52 and tapers to a tip 58 protrudes from the barrel 50. The tip 58 defines a terminal orifice 60 of the nozzle 56. A plunger 62 that can move axially within the interior chamber 52 and apply pressure to the polymer liquid 54, thus forcing the polymer liquid 54 through the orifice 60 at a controllable flow rate, is located within the barrel 50. The plunger 62 includes a plunger head 64 radially sealed against the barrel 50 by an appropriate dynamic sealing element. Advancement of the plunger head 64 against the polymer liquid 54 contained in the interior chamber 52 is controlled by a metering device 66. The metering device 66 may be a programmable syringe pump 68, as shown, or it may be some other device that can affect axial motion of the plunger head 64 such as, for example, a system of one or more coordinated valves that can apply pneumatic gas pressure.

The polymer liquid 54 contained in the interior chamber 52 of the barrel 50 and the tubular nozzle 56 is preferably a solution or melt of the polymer material intended to be transformed into the polymer fiber(s) that constitute the fibrous mass of the non-woven polymer fiber mat 122. The temperature of the liquid polymer 54 in the tubular nozzle 56 depends on its compositional makeup. For instance, some polymer solutions, depending on the polymer material dissolved and the polymer material concentration, can be kept at room temperature while others need to be heated to keep the polymer material solvated. Polymer melts usually always have to be heated to some extent. Those skilled in the art will know how to prepare, handle, and properly administer the liquid polymer 54 within the electrospinning apparatus 40 for a wide variety of polymer materials including those mentioned before. Some of those previously-mentioned polymer materials are nonetheless listed below in Table 1 along with at least one compatible solvent that may be used to prepare a polymer solution, if desired, as well as an indication of which polymer materials are preferably employed in melt form.

TABLE 1

Electrospinning of Various Polymer Materials

| Polymer Material | Solvent |
|---|---|
| Polyimide (i.e., PEI) | N-Methyl-2-Pyrrolidone (NMP), Dimethyl Formamide (DMF), Tetrahydrofuran (THF), Phenol |
| Flouropolymer (i.e., PVdF) | N-Methyl-2-Pyrrolidone (NMP), Dimethyl Formamide (DMF), Methyl Isobutyl Ketone, Dimethyl Pthalate, Acetone |
| Thermoplastic Polyeseter (i.e., PET) | Trifluoroacetic Acid, Dimethyl Chloride, or Melt |
| PES | Tetrahydrofuran (THF), N-Methyl-2-Pyrrolidone (NMP), Dimethyl Formamide (DMF) |
| PAS, PPSF | N-Methyl-2-Pyrrolidone (NMP), Dimethyl Formamide (DMF), Tetrahydrofuran (THF) |
| PAN | N-Methyl-2-Pyrrolidone (NMP), Dimethyl Formamide (DMF), Tetrahydrofuran (THF) |
| Polyacrylate (i.e., PMMA) | N-Methyl-2-Pyrrolidone (NMP), Dimethyl Formamide (DMF), Dimethyl Sulfoxide (DMSO), Acetone, Tert-butyl Alcohol |
| Aliphatic PA (i.e., Nylon 6 and Nylon 6,6) | Aqueous Acetic Acid or Melt |
| Aromatic PA (i.e., polyparaphenylene terephthalamide) | Sulfuric Acid |
| Polycarbonate (i.e., poly(bisphenol A-carbonate)) | N-Methyl-2-Pyrrolidone (NMP), Dimethyl Formamide (DMF), Dimethyl Sulfoxide (DMSO) |
| Polyurethane | N-Methyl-2-Pyrrolidone (NMP), Dimethyl Formamide (DMF), Dimethyl Sulfoxide (DMSO) |
| Liquid Crystal Polymer (i.e., Vectran ®) | Melt |

The high-voltage DC power supply 48 is operatively coupled to the electrospinning apparatus 40 so that an electrical field can be generated between the tip 58 of the tubular nozzle 56 and the collection face 44 of the collector substrate 42. This can be accomplished by applying an electrical potential to the tip 58 of the nozzle 56 so that an electrical potential difference exists between the tip 58 and the collection face 44. Either the positive terminal, as shown in FIG. 3, or the negative terminal of the power supply 48 may deliver the applied electrical potential to the tip 58 of the nozzle 56 through an electrode or other appropriate connection. Conversely, the collection face 44 may be grounded, which is the preferred arrangement and shown in FIG. 3, or coupled to a terminal of opposite polarity from the one coupled to the electrospinning apparatus 40. The opposite polarity terminal, if used, may originate from the same power supply 48 or a different one. Once established, the electric field generated between the tip 58 of the tubular nozzle 56 and the collection face 44 collector substrate 42 can be strengthened or weakened by adjusting the electrical potential difference induced by the high-voltage DC power supply 48. For example, the high-voltage DC power supply 48 is usually operated to administer an electrical potential difference between the tip 58 and the collection face 44 that ranges anywhere from about 5 kV to about 50 kV.

The non-woven polymer fiber mat 122 may be fabricated by positioning the collection face 44 of the collector substrate 42 in close proximity—usually within about 5 to about 40 cm—to the tip 58 of the tubular nozzle 56 and then electrospinning the mat 22 over the collection face 44 from the liquid polymer 54. The composition and diameter of the electrospun polymer fiber(s), as well as the thickness of the fibrous mass that constitutes the non-woven polymer fiber mat 122, can each be dictated by one or more process parameters associated with operation of the electrospinning apparatus 40 as is well understood by those skilled in the art. For example, these aspects of the non-woven polymer fiber mat 122 can be influenced by the properties of the polymer liquid 54 (i.e., the particular polymer material selected, the concentration of the polymer material if the polymer liquid is in solution form, the temperature of the liquid polymer if in melt form, etc.), the flow rate of the liquid polymer 54 through the orifice 60 of the nozzle 56 as prescribed by the metering device 66, the distance between the collection face 44 of the collector substrate 42 and the tip 58 of the tubular nozzle 56, and the strength of the electric field induced by the high-voltage DC power supply 48.

Electrospinning of the non-woven polymer fiber mat 122 typically begins by generating the electric field with the high-voltage DC power supply 48. This may involve, as mentioned before, applying an electrical potential—derived from either the positive or negative terminal of the power supply 48- to the tip 58 of the tubular nozzle 56 while, at the same time, grounding the collector substrate 42 or applying an electrical potential from a terminal of the opposite polarity. The liquid polymer 54 contained in the tubular nozzle 56 is then pushed through the orifice 60 by the plunger head 64 to form a pendant droplet held at the tip 58 of the nozzle 56 by surface tension. The electric field generated by the high-voltage DC power supply 48 promotes mutual charge repulsion within the droplet that, together with the tendency of the charged polymer material to move towards the collector substrate 42, induces an electrostatic force that counteracts surface tension.

At some point the strength of the electric field causes the generally hemispherical surface of the pendant droplet to elongate into a conical shape known as a Taylor cone 70, as illustratively depicted in FIG. 4. Upon further strengthening of the electric field, the repulsive electrostatic force eventually overcomes the surface tension and an electrified jet 72 of the liquid polymer 54 is ejected from the Taylor cone 70 towards the collection face 44 of the collector substrate 42. Small bends in the ejected electrified jet 72 repel one another while moving through the electric field and initiate whipping of the jet 72. This whipping phenomenon, in turn, results in lengthening and thinning of the electrified jet 72 and, if present, solvent evaporation. The electrified jet 72, whether originally formed as a polymer solution or a polymer melt, eventually solidifies into the nanometer to micrometer diameter-sized polymer fiber, in flight, and collects on the collection face 44 of the collector substrate 42. Over time this collection of polymer fiber(s) on the collection face 44 materializes into the fibrous mass of the non-woven polymer fiber mat 122. Relative side-to-side and/or rotational movement between the nozzle 56 and the collection face 44 of the collector substrate 42 may be employed to ensure the non-woven polymer fiber mat 122 is deposited evenly on the collection face 44 or as otherwise intended.

Referring now back to FIGS. 1 and 2 generally, the deposition of the non-woven polymer fiber mat 22, 122 onto the collection face 44 of the collector substrate 42 produces the electrode-separator integral segment 10, 110. Additional steps may now be performed on the electrode-separator integral segment 10, 110, if desired. For example, as shown in FIG. 5, the electrode-separator integral segment 10, 110 may be calendered in a calendering apparatus 80 to hot-press the various components of the segment 10, 110 together in order to improve their mechanical performance and dimensional uniformity. The calandering apparatus 80 includes at least a pair of counter-rotating rollers 82 between which the electrode-separator integral segment 10, 110 is passed. The rollers 82 are preferably heated and, together, they exert a pressure that compresses the electrode-separator integral segment 10, 110 as it passes between them. Other steps in addition to, or in lieu of, the calendering step just described may also be practiced on the electrode-separator integral segment 10, 110 before it is assembled into an electrochemical cell of a lithium ion battery even though such steps are not specifically discussed here.

Figure 6:
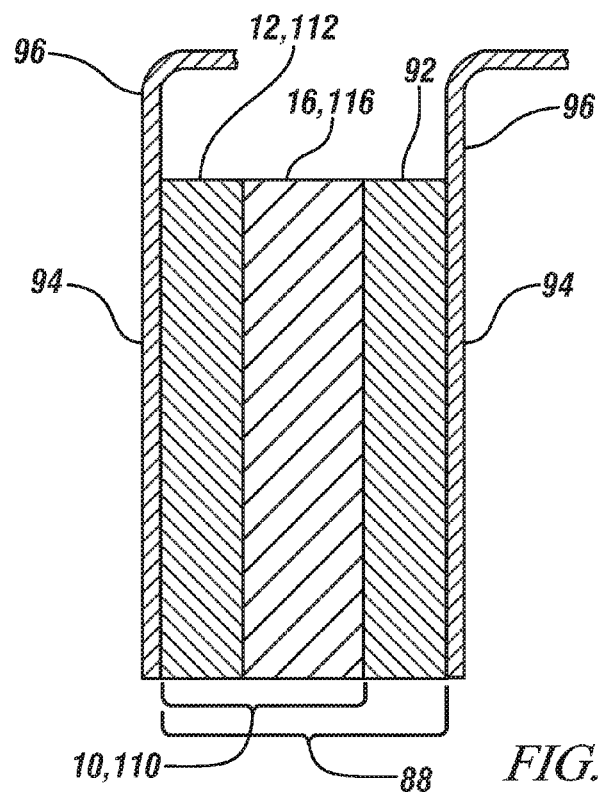
FIG. 6 is a generalized cross-sectional view of an electrochemical battery cell formed with the electrode-separator integral segment depicted in FIG. 1 or 2.
Figure 7:
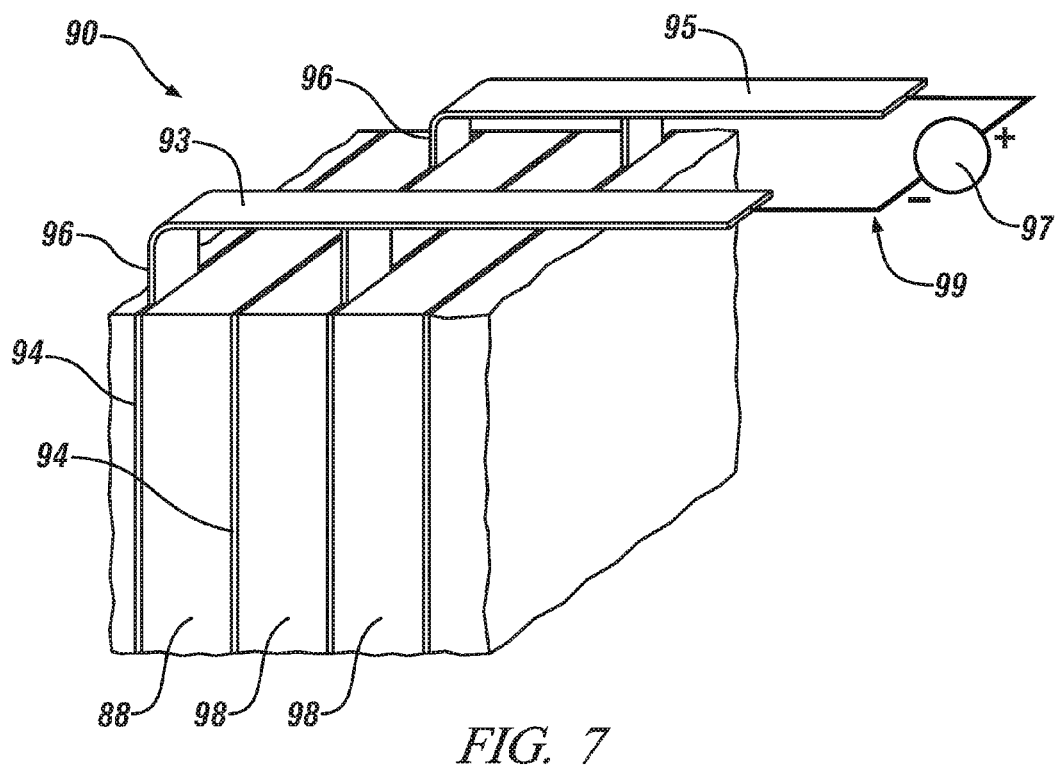
FIG. 7 is a generalized and schematic illustration of a lithium ion battery that includes the electrochemical battery cell depicted in FIG. 6.

Once formed, the electrode-separator integral segment 10, 110 may be assembled into an electrochemical battery cell 88 of a lithium ion battery 90 as shown, for example, in FIGS. 6-7. The electrochemical battery cell 88—which comprises a negative electrode and a positive electrode physically separated and electrically insulated by the separator 16, 116—is formed by pressing together the electrode-separator integral segment 10, 110 with another electrode 92 composed to function as the opposite of the electrode 12, 112 included in the integral segment 10, 110. That is, if the electrode 12 included in the electrode-separator integral segment 10, 110 is composed as a negative electrode, then the other electrode 92 combined with the electrode-separator integral segment 10, 110 is composed as a positive electrode, and vice-versa. Situated on each side of the electrochemical battery cell 88 is a metallic current collector 94 of the appropriate metallic construction. The metallic current collectors 94 may include tabs 96 for accommodating an electrical connection. Each of the metallic current collectors 94 preferably engages their respective electrodes 12, 112, 92 over an appreciable interfacial surface area to facilitate the efficient collection and distribution of free electrons.

The separator 16, 116 functions as a thin and electrically insulative mechanical barrier layer that physically separates the confronting electrodes 12, 112, 92 to prevent a short-circuit in the electrochemical battery cell 88. The non-woven polymer fiber mat 22, 122 renders the separator 16, 116 sufficiently porous to permit infiltration of a liquid electrolyte solution and the internal passage of dissolved lithium ions. The non-woven polymer fiber mat at 22, 122 or the combination of the non-woven polymer fiber mat 22, 122 and the ceramic particle layer 126 is also thermally stable enough that a temperature spike above 80° C. in the electrochemical battery cell 88 can be endured by the separator 16, 116 without a significant sacrifice in functionality. The separator 16, 116 will not soften, melt, chemically react with the liquid electrolyte solution, or experience dimensional shrinkage at such temperatures. Dimensional shrinkage is avoided because the manufacture of the non-woven polymer fiber mat 22, 122 does not require significant stretching to provide it with the appropriate porosity. The ability of the separator 16, 116 to withstand potential spikes in temperature provides the electrochemical battery cell 90 with durability and helps prevent short-circuit events that may cause the cell 90 to lose capacity or fail altogether.

The separator 16, 116 of the electrochemical battery cell 88 is soaked with a liquid electrolyte solution that is able to communicate lithium ions. The liquid electrolyte solution, which also wets both electrodes 12, 112, 92, is preferably a lithium salt dissolved in a non-aqueous solvent. Some suitable lithium salts that may be used to make the liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

The electrochemical battery cell 88 may be connected to a plurality of other electrochemical cells, identified generally as numeral 98, to assemble the lithium ion battery 90, as shown in FIG. 7. The generally-identified electrochemical battery cells 98 may be structurally the same, and formed in the same manner, as the electrochemical battery cell 88 just described, if desired, or they may be different. Anywhere from five to one hundred and fifty of the electrochemical battery cells 88, 98 are typically connected in series (although a parallel connection is also permitted) if the lithium ion battery 90 is intended for use in a vehicle powertrain. The lithium ion battery 90 can be further connected serially or in parallel to other similarly constructed lithium ion batteries to form a lithium ion battery pack that exhibits the voltage and current capacity demanded for a particular vehicle application. While the electrochemical battery cells 88, 98 incorporated into the lithium ion battery 90 shown in FIG. 7 are rectangularly-shaped and stacked side-by-side in a modular configuration, it should be understood the lithium ion battery 90 shown here is only a schematic illustration. FIG. 7 is not intended to inform the relative sizes of the electrochemical battery cells' components or to limit the wide variety of structural configurations the lithium ion battery 90 may assume. Various structural modifications to the lithium ion battery 90 shown in FIG. 7 are possible despite what is explicitly illustrated.

A negative terminal 93 and the positive terminal 95 of the lithium ion battery 90 may be connected to an electrical device 97 as part of an interruptible circuit 99 established between the negative electrodes and the positive electrodes of the several electrochemical battery cells 88, 98. The electrical device 97 may be a wide variety of electrical loads and power-generating devices. An electrical load is a power-consuming device that is powered fully or partially by the lithium ion battery 90. Conversely, a power-generating device is one that charges or re-powers the lithium ion battery 90 through an applied external voltage. The electrical load and the power-generating device can be the same device in some instances. For example, the electrical device 97 may be an electric motor for a hybrid electric or an extended range electric vehicle that is designed to draw an electric current from the lithium ion battery 90 during acceleration and provide a regenerative electric current to the lithium ion battery 90 during deceleration. The electrical load and the power-generating device can also be different devices. For example, the electrical load may be an electric motor for a hybrid electric or an extended range electric vehicle and the power-generating device may be an AC wall outlet, an internal combustion engine, and/or a vehicle alternator.

The lithium ion battery 90 can provide a useful electrical current to the electrical device 97 by way of reversible electrochemical reactions that occur in the electrochemical battery cells 88, 98 when the interruptible circuit 99 is closed to connect the negative terminal 93 and the positive terminal 95 at a time when the negative electrodes contain a sufficient quantity of intercalated lithium (i.e., battery discharge). The electrochemical potential difference between the negative electrode and the positive electrode in each cell 88, 99—approximately 2.5 to 4.3V—drives the oxidation of intercalated lithium contained in the negative electrodes. Free electrons produced by this oxidation reaction are collected by the current collectors 94 associated with the negative electrodes and are supplied to the negative terminal 93. A flow of free electrons is harnessed and directed through the electrical device 97 from the negative terminal 93 to the positive terminal 95 and eventually to the positive electrodes by way of current collectors 94 associated with the positive electrodes. Lithium ions, which are also produced at the negative electrodes, are concurrently carried through the separators by the liquid electrolyte solution in route to the positive electrodes as well. The flow of free electrons through the electrical device 97 from the negative terminal 93 to the positive terminal 95 can be continuously or intermittently provided until the negative electrodes are depleted of intercalated lithium and the capacity of the electrochemical battery cells 88, 98 is spent.

The lithium ion battery 90 can be charged or re-powered at any time by applying an external voltage to the electrochemical battery cells 88, 98 to reverse the electrochemical reactions that occur during discharge. The applied external voltage compels the otherwise non-spontaneous oxidation of intercalated lithium contained in the positive electrodes to produce free electrons and lithium ions. The free electrons are collected by the current collectors 94 associated with the positive electrodes and are supplied to the positive terminal 95. A flow of the free electrons is directed to the negative terminal 93 and eventually to the negative electrodes by way of the current collectors 94 associated with the negative electrodes. The lithium ions are concurrently carried back through the separators in the liquid electrolyte solution towards the negative electrodes as well. The lithium ions and the free electrons eventually reunite and replenish the negative electrodes with intercalated lithium to prepare the electrochemical battery cells 88, 98 for another discharge phase. The external voltage may originate from the electrical device 97 as previously mentioned or by some other suitable mechanism.

The above description of preferred exemplary embodiments is merely descriptive in nature and not intended to limit the scope of the claims that follow. Each of the terms used in the appended claims should be given its ordinary and customary meaning unless specifically and unambiguously stated otherwise in the specification.

The invention claimed is:

1. A method of making a separator that is disposed between a negative electrode and a positive electrode in an electrochemical battery cell of a lithium ion battery, the method comprising:
    (a) positioning a collection face of a collector substrate proximate an electrospinning apparatus, the collector substrate comprising an electrode composed as either a positive or a negative electrode for an electrochemical battery cell of a lithium ion battery and a ceramic particle layer overlying the electrode and being exposed at the collection face; and
    (b) electrospinning a non-woven polymer fiber mat comprised of a fibrous mass of one or more polymer fibers onto the ceramic particle layer at the collection face of the collector substrate to form an electrode-separator integral segment, the non-woven polymer fiber mat having a thickness that ranges from about 5 µm to about 50 µm.

2. The method set forth in claim 1, wherein the one or more polymer fibers are comprised of a polyolefin, a polyimide, a polyamide, a polysulfone, a polyester, a fluoropolymer, a polyacrylate, polyacrylonitrile, a polycarbonate, a polyurethane, or mixtures thereof.

3. The method set forth in claim 1, wherein the one or more polymer fibers are comprised of polypropylene, polyethylene, polyetherimide, polyhexamethylene adipamide, polycaprolactam, polyparaphenylene terephthalamide, polyarylsulfone, polyethersulfone, polyphenylsulfone, polyethylene terephthalate, polyvinylidene fluoride, poly(methyl methacrylate), poly(bisphenol A-carbonate), or mixtures thereof.

4. The method set forth in claim 1, wherein the one or more polymer fibers are comprised of polyethylene terephthalate, polyvinylidene fluoride, polyacrylonitrile, polyetherimide, an aromatic polyamide, a liquid crystal polymer, or mixtures thereof.

5. The method set forth in claim 1 further comprising:
    (c) assembling the electrode-separator integral segment into an electrochemical battery cell of a lithium ion battery, the electrochemical battery cell comprising (1) a separator comprised of the electrode-separator integral segment, (2) another electrode, which is composed to function as the opposite of the electrode included in the electrode-separator integral segment, pressed against the separator, and (3) a liquid electrolyte solution infiltrated into the separator, the liquid electrolyte solution comprising a lithium salt dissolved in a non-aqueous solvent.

6. The method set forth in claim 1 further comprising:
    (c) calendering the electrode-separator integral segment.

7. The method set forth in claim 6 further comprising:
    (d) assembling the electrode-separator integral segment into an electrochemical battery cell of a lithium ion battery, the electrochemical battery cell comprising (1) a separator comprised of the electrode-separator integral segment, (2) another electrode, which is composed to function as the opposite of the electrode included in the electrode-separator integral segment, pressed against the separator, and (3) a liquid electrolyte solution infiltrated into the separator, the liquid electrolyte solution comprising a lithium salt dissolved in a non-aqueous solvent.

8. The method set forth in claim 1, wherein the one or more polymer fibers that form the non-woven polymer fiber mat are comprised of a polyolefin.

9. An electrochemical battery cell of a lithium ion battery that includes a separator made according to the method set forth in claim 1.

10. A method of making a separator that is disposed between a negative electrode and a positive electrode in an electrochemical battery cell of a lithium ion battery, the method comprising:
    (a) positioning a collection face of a collector substrate proximate a tip of a nozzle of an electrospinning apparatus, the collector substrate comprising an electrode composed as either a positive or a negative electrode for an electrochemical battery cell of a lithium ion battery and a ceramic particle layer overlying the electrode and being exposed at the collection face;

(b) generating an electric field between the tip of the nozzle and the collection face of the collector substrate;

(c) pushing a liquid polymer conducive to electrospinning through an orifice at the tip of the nozzle so that an electrically charged jet of the liquid polymer is ejected towards the collection face of the collector substrate; and (d) collecting a fibrous mass of one or more polymer fibers derived from the electrified jet of the liquid polymer onto the collection face to form a non-woven polymer fiber mat and to fabricate an electrode-separator integral segment, the one or more polymer fibers that constitute the non-woven polymer fiber mat having a diameter in the range of about 10 nm to about 10 μm.

11. The method set forth in claim 1 further comprising:

(e) assembling the electrode-separator integral segment into an electrochemical battery cell of a lithium ion battery, the electrochemical battery cell comprising (1) a separator comprised of the electrode-separator integral segment, (2) another electrode, which is composed to function as the opposite of the electrode included in the electrode-separator integral segment, pressed against the separator, and (3) a liquid electrolyte solution infiltrated into the separator, the liquid electrolyte solution comprising a lithium salt dissolved in a non-aqueous solvent.

12. The method set forth in claim 10, wherein the one or more polymer fibers are comprised of a polyolefin, a polyimide, a polyamide, a polysulfone, a polyester, a fluoropolymer, a polyacrylate, polyacrylonitrile, a polycarbonate, a polyurethane, or mixtures thereof.

13. The method set forth in claim 10, wherein the one or more polymer fibers are comprised of polypropylene, polyethylene, polyetherimide, polyhexamethylene adipamide, polycaprolactam, polyparaphenylene terephthalamide, polyarylsulfone, polyethersulfone, polyphenylsulfone, polyethylene terephthalate, polyvinylidene fluoride, poly(methyl methacrylate), poly(bisphenol A-carbonate), or mixtures thereof.

14. The method set forth in claim 10, wherein the one or more polymer fibers are comprised of polyethylene terephthalate, polyvinylidene fluoride, polyacrylonitrile, polyetherimide, an aromatic polyamide, a liquid crystal polymer, or mixtures thereof.

15. The method set forth in claim 10, wherein step (b) comprises applying an electrical potential to the tip of the nozzle so that an electrical potential difference exists between the tip and the collection face that ranges from about 5 kV to about 50 kV.

16. The method set forth in claim 10, wherein the non-woven polymer fiber mat has a thickness that ranges from about 5 mg to about 50 mg.

17. The method set forth in claim 10, wherein the collector substrate comprises the electrode and the ceramic particle layer overlying the electrode such that the ceramic particle layer is exposed at the collection face.

18. The method set forth in claim 17, wherein the one or more polymer fibers that form the non-woven polymer fiber mat are comprised of polyethylene or polypropylene.

19. A method comprising:

applying a ceramic particle layer over an electrode to provide a collector substrate in which the ceramic particle layer is exposed at a collection face of the collector substrate, the electrode being composed as either a positive or a negative electrode for an electrochemical battery cell of a lithium ion battery;

operating an electrospinning apparatus to electrospin a non-woven polymer fiber mat, which is comprised of a fibrous mass of one or more polymer fibers, onto the collection face of the collector substrate to form an electrode-separator integral segment, the one or more polymer fibers being derived from a solution or a melt of a polymer material; and pressing another electrode, which is composed to function as the opposite of the electrode included in the electrode-separator integral segment, against a separator that comprises the electrode-separator segment such that the two electrodes are on opposite sides of the non-woven polymer fiber mat.

20. The method set forth in claim 19, wherein the ceramic particle layer has a thickness that ranges from 5 μm to 20 μm.

* * * * *